US012431636B2

(12) United States Patent
Li et al.

(10) Patent No.: US 12,431,636 B2
(45) Date of Patent: Sep. 30, 2025

(54) ANTENNA VIBRATOR AND ANTENNA

(71) Applicant: Suzhou Luxshare Technology Co., Ltd., Suzhou (CN)

(72) Inventors: Zhenhua Li, Suzhou (CN); Chengyu Xu, Suzhou (CN); Wenkai Xu, Suzhou (CN); Gang Zhou, Suzhou (CN)

(73) Assignee: SUZHOU LUXSHARE TECHNOLOGY CO., LTD, Suzhou (CN)

( * ) Notice: Subject to any disclaimer, the term of this patent is extended or adjusted under 35 U.S.C. 154(b) by 266 days.

(21) Appl. No.: 18/199,190

(22) Filed: May 18, 2023

(65) Prior Publication Data

US 2024/0113447 A1 Apr. 4, 2024

(30) Foreign Application Priority Data

Sep. 30, 2022 (CN) ......................... 202211213735.3

(51) Int. Cl.

| | |
|---|---|
| ***H01Q 9/04*** | (2006.01) |
| ***H01Q 1/38*** | (2006.01) |
| ***H01Q 1/50*** | (2006.01) |
| ***H01Q 19/10*** | (2006.01) |
| ***H01Q 21/24*** | (2006.01) |

(52) U.S. Cl.
CPC ............... *H01Q 21/24* (2013.01); *H01Q 1/38* (2013.01); *H01Q 1/50* (2013.01); *H01Q 19/10* (2013.01)

(58) Field of Classification Search
CPC ............ H01Q 21/24; H01Q 1/38; H01Q 1/50; H01Q 19/10; H01Q 1/42; H01Q 9/0442; H01Q 9/045; H01Q 9/0478; H01Q 1/246; H01Q 1/36; H01Q 1/52; H01Q 13/10
See application file for complete search history.

(56) References Cited

U.S. PATENT DOCUMENTS

| | | | | |
|---|---|---|---|---|
| 7,079,079 | B2 | 7/2006 | Jo et al. | |
| 7,688,271 | B2 | 3/2010 | Cao et al. | |
| 2004/0217910 | A1 | 11/2004 | Montgomery et al. | |
| 2022/0029279 | A1 * | 1/2022 | Jiang ...................... | H01Q 19/10 |

FOREIGN PATENT DOCUMENTS

| | | | |
|---|---|---|---|
| CN | 201374390 | Y | 12/2009 |
| CN | 201994412 | U | 9/2011 |
| CN | 106356630 | A | 1/2017 |

(Continued)

*Primary Examiner* — David E Lotter
(74) *Attorney, Agent, or Firm* — Birch, Stewart, Kolasch & Birch, LLP

(57) ABSTRACT

The embodiments of the present disclosure provide an antenna vibrator and an antenna, and the antenna vibrator includes a radiation board. A partial region of the radiation board is bent downwards to form a plurality of support portions and a plurality of corresponding first hollowed-out holes, and a region between two adjacent first hollowed-out holes is bent downwards to form a plurality of bending portions and a plurality of corresponding second hollowed-out holes. The support portion serves to support and connect. At the same time, by forming the bending portion and the second hollowed-out hole on the radiation board, the isolation of the vibrator is optimized, and the cross polarization ratio after the vibrator being arrayed may meet conventional index without adding a boundary condition.

18 Claims, 8 Drawing Sheets

(56) References Cited

FOREIGN PATENT DOCUMENTS

| | | | | | |
|---|---|---|---|---|---|
| CN | 108539397 | A | | 9/2018 | |
| CN | 109088087 | A | | 12/2018 | |
| CN | 110190392 | A | | 8/2019 | |
| CN | 111541010 | A | * | 8/2020 | ............ H01Q 1/246 |
| CN | 211670319 | U | | 10/2020 | |
| CN | 211829186 | U | | 10/2020 | |
| CN | 212626051 | U | * | 2/2021 | |
| CN | 212686051 | U | | 2/2021 | |
| CN | 112467343 | A | | 3/2021 | |
| CN | 113131197 | A | | 7/2021 | |
| CN | 214254715 | U | * | 9/2021 | .............. H01Q 1/36 |
| CN | 113517550 | A | | 10/2021 | |
| CN | 114069212 | A | | 2/2022 | |
| CN | 215818398 | U | | 2/2022 | |
| CN | 216288941 | U | | 4/2022 | |
| CN | 107579351 | B | | 4/2023 | |
| CN | 218788504 | U | | 4/2023 | |
| CN | 218827854 | U | | 4/2023 | |
| TW | 200701559 | | | 1/2007 | |
| TW | M420057 | U1 | | 1/2012 | |
| WO | WO 2021/046665 | A1 | | 3/2021 | |
| WO | WO 2021/226837 | A1 | | 11/2021 | |

* cited by examiner

ANTENNA VIBRATOR AND ANTENNA

CLAIM OF PRIORITY AND CROSS-REFERENCE TO RELATED APPLICATION(S)

This application claims the benefit of Chinese Patent Application No. 202211213735.3, filed on Sep. 30, 2022, which is incorporated herein by reference in its entirety.

BACKGROUND OF THE DISCLOSURE

1. Field of the Disclosure

The present disclosure relates to the technical field of communications, and in particular to an antenna vibrator and an antenna.

2. Description of the Related Art

A sheet metal stamping vibrator is a common vibrator used in 5G Massive Multiple Input Multiple Output (MIMO) base station antenna. In an array composed of the vibrators, optimization of a cross polarization ratio may be implemented by adding a boundary condition (such as a sheet metal) to a sub-array, and light-weight requirement of the base station antenna structure may not be met.

BRIEF DESCRIPTION OF THE DISCLOSURE

In view of this, a purpose of the present disclosure is to provide an antenna vibrator and an antenna to implement that a cross polarization ratio of the constituent array meets a conventional index without adding a boundary condition.

In a first aspect, an embodiment of the present disclosure provides an antenna vibrator, including: a radiation board, where a partial region of the radiation board is bent downwards to form a plurality of support portions and a plurality of first hollowed-out holes, and a region of the radiation board between two adjacent first hollowed-out holes is bent downwards to form a plurality of bending portions and a plurality of second hollowed-out holes.

Further, the bending portion is bent downwards along the outer edge of the second hollowed-out hole.

Further, the height of the bending portion is greater than or equal to 0.045 center frequency wavelengths and less than or equal to 0.085 center frequency wavelengths.

Further, the radiation board is square, and a side length of the radiation board is greater than or equal to 0.32 center frequency wavelengths and less than or equal to 0.42 center frequency wavelengths; and the four first hollowed-out holes are uniformly distributed at a diagonal of the radiation board.

Further, the second hollowed-out hole is in an isosceles trapezoidal shape, the lower line length of the second hollowed-out hole is greater than or equal to 0.07 center frequency wavelengths and less than or equal to 0.13 center frequency wavelengths, and the height of the second hollowed-out hole is greater than or equal to 0.05 center frequency wavelengths and less than or equal to 0.09 center frequency wavelengths.

Further, the support portion is bent downwards along the inner edge of the first hollowed-out hole.

Further, a lower end of the support portion is bent to form a connecting portion.

Further, the height of the support portion is greater than or equal to 0.06 center frequency wavelengths and less than or equal to 0.12 center frequency wavelengths.

Further, the first hollowed-out hole is rectangular, and the width of the first hollowed-out hole is greater than or equal to 0.025 center frequency wavelengths and less than or equal to 0.045 center frequency wavelengths.

In a second aspect, an embodiment of the present disclosure provides an antenna, including: a feed member; the antenna vibrator according to the first aspect, the antenna vibrator being electrically connected to the feed member through the support portion; and an antenna cover covering the antenna vibrator.

The embodiments of the present disclosure provide an antenna vibrator and an antenna, and the antenna vibrator includes a radiation board. A partial region of the radiation board is bent downwards to form a plurality of support portions and a plurality of corresponding first hollowed-out holes, and a region between two adjacent first hollowed-out holes is bent downwards to form a plurality of bending portions and a plurality of corresponding second hollowed-out holes. The support portion serves to support and connect. At the same time, by forming the bending portion and the second hollowed-out hole on the radiation board, the isolation of the vibrator is optimized, and the cross polarization ratio after the vibrator being arrayed may meet conventional index without adding a boundary condition.

BRIEF DESCRIPTION OF THE DRAWINGS

The foregoing and other objects, features and advantages of the present disclosure will become more apparent from the following description of embodiments of the present disclosure with reference to the accompanying drawings, in which.

DETAILED DESCRIPTION OF EMBODIMENTS OF THE DISCLOSURE

The present disclosure is described below based on the embodiments, but the present disclosure is not limited thereto. In the following detailed description of the present disclosure, certain specific details are described in detail. The present disclosure may be fully understood by those skilled in the art without the description of these detailed parts. In order to avoid confusing the substance of the present disclosure, well-known methods, processes, flows, elements and circuits have not been described in detail.

In addition, it should be understood by those of ordinary skill in the art that the drawings provided herein are for illustrative purposes, and the drawings are not necessarily drawn to scale.

Unless expressly required in the context, the terms "include", "comprise", and other similar words should be construed as inclusive rather than exclusive or exhaustive, that is, the meaning of "including, but not limited to".

In the description of the present disclosure, it should be understood that the terms "first", "second", etc. are merely used for descriptive purposes, but may not be understand as indicating or implying relative importance. In addition, in the description of the disclosure, unless otherwise stated, "plurality" means two or more.

Figure 1:
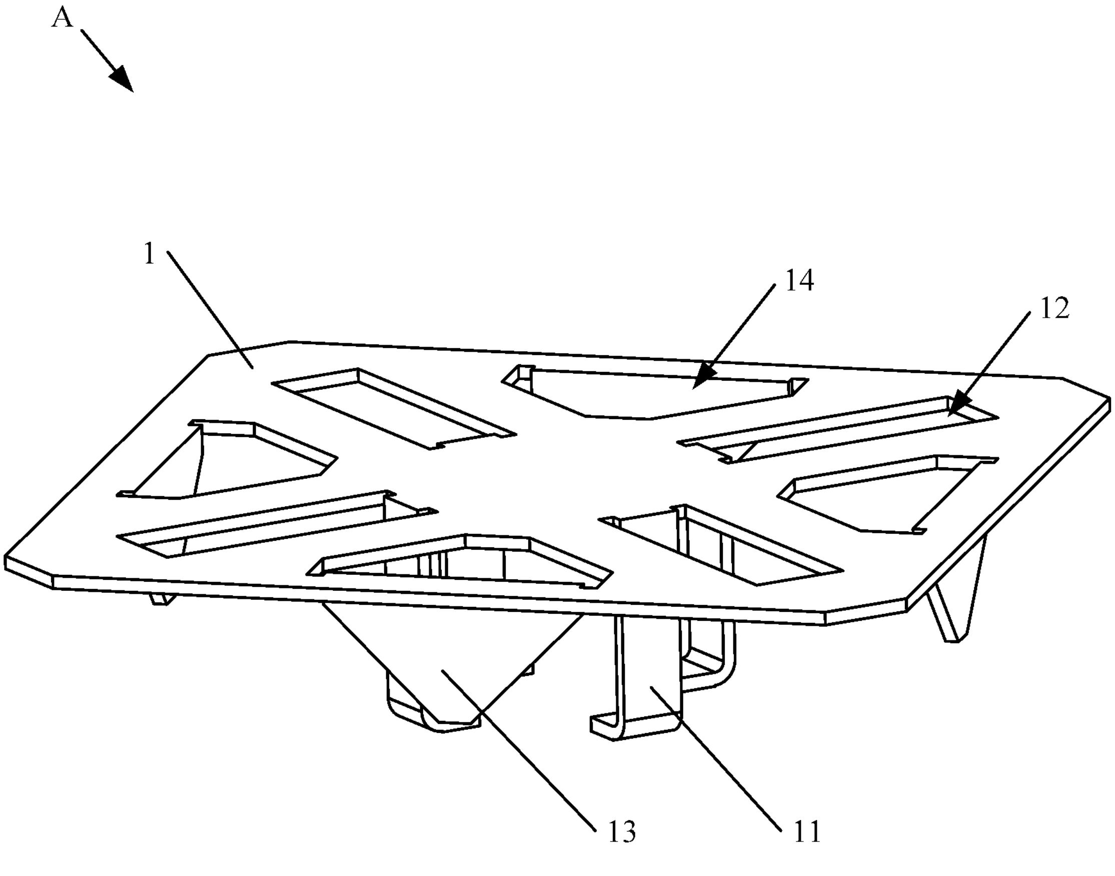
FIG. 1 is a schematic structural diagram of an antenna vibrator provided by a first embodiment of the present application.
Figure 2:
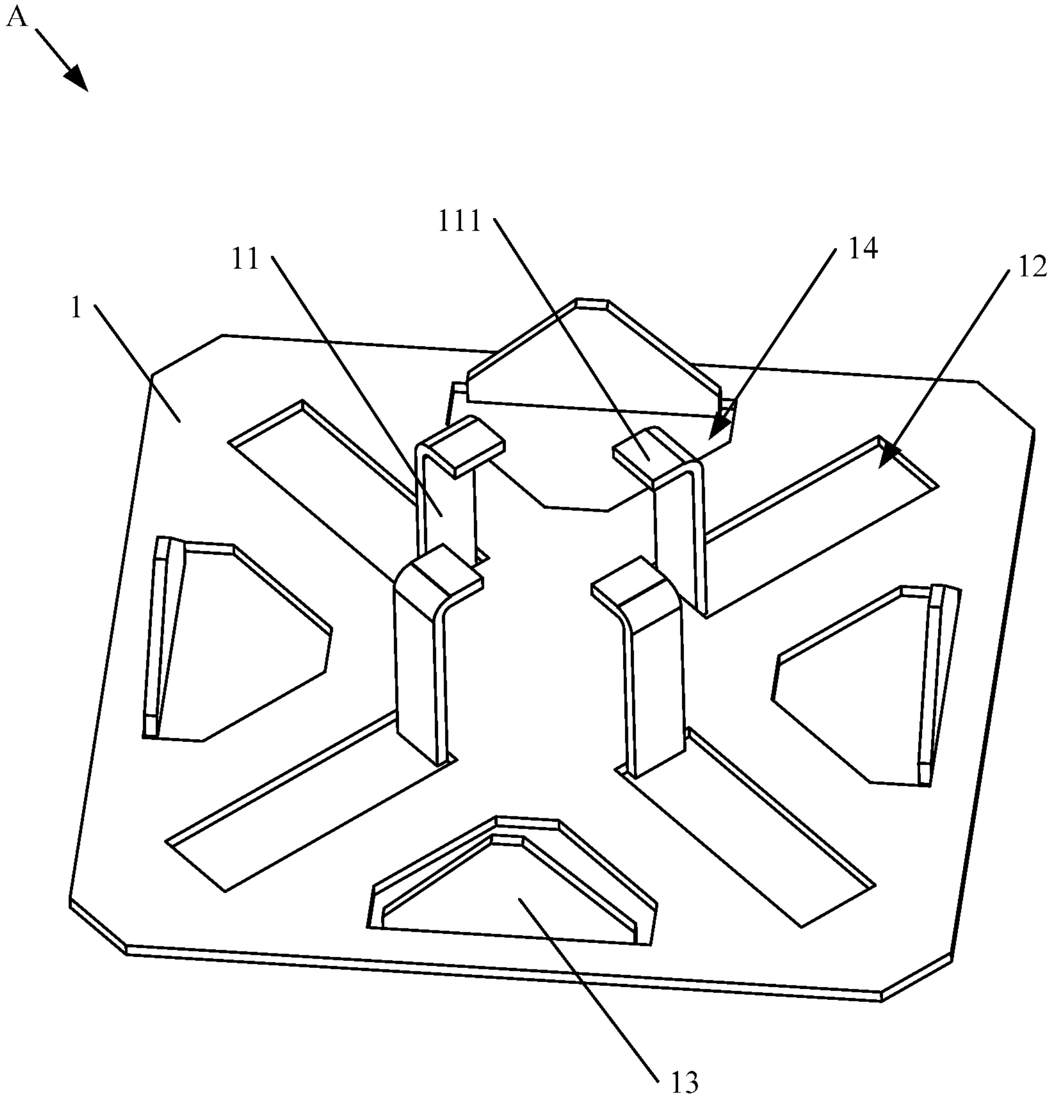
FIG. 2 is a schematic structural diagram of another view of an antenna vibrator provided by a first embodiment of the present application.

FIG. 1 is a schematic structural diagram of an antenna vibrator A provided by a first embodiment of the present application, and FIG. 2 is a schematic structural diagram of another view of an antenna vibrator A provided by a first embodiment of the present application. As shown in FIGS. 1 and 2, the antenna vibrator A includes a radiation board 1 used to transmit or receive a communication signal. Further, a partial region of the radiation board 1 is bent downwards to form a plurality of support portions 11 and a plurality of first hollowed-out holes 12. The support portion 11 supports and feeds the radiation board 1. It should be noted that the antenna vibrator A in this embodiment is formed by stamping a sheet metal part (such as an aluminum sheet or a copper sheet). In other words, after being stamped, the sheet metal part forms the radiation board 1 with a flat plate structure and the and the support portion 11 bending downwards, and the first hollowed-out hole 12 is a through hole, corresponding to the support portion 11, on the radiation board 1.

Further, as shown in FIGS. 1 and 2, and the radiation board 1 is bent downwards in a region between two adjacent first hollowed-out holes 12 to form a plurality of bending portions 13 and a plurality of second hollowed-out holes 14. Similarly, the bending portion 13 is formed by stamping the sheet metal part, and the second hollowed-out hole 14 is a through hole, corresponding to the bending portion 13, on the radiation board 1. Thus, the antenna vibrator A is integrally formed by stamping, the processing is simple and efficient, and the material cost is greatly reduced.

It should be noted that, the antenna vibrator A in this embodiment implements the optimization of the isolation of the antenna vibrator A by improving the radiation board 1, that is, through the bending portion 13 and the second hollowed-out hole 14 that are formed by stamping, and the cross polarization ratio of the antenna vibrator A after forming an array may be enabled to meet a conventional index without adding a boundary condition. In another aspect, the first hollowed-out hole 12 and the second hollowed-out hole 14 are arranged on the radiation board 1, which helps to reduce the weight of the antenna vibrator A, so as to implement lightweight of the antenna vibrator A and the antenna.

As shown in FIGS. 1 and 2, in this embodiment, the bending portion 13 is bent downwards along the outer edge of the second hollowed-out hole 14. In other words, the bending portion 13 is located on an outward side. In an implementation, a bending angle of the bending portion 13 is 90°, that is, the bending portion 13 is perpendicular to the radiation board 1. By providing the bending portion 13, the isolation of the antenna vibrator A may be increased and the cross polarization ratio of the array may be optimized.

Figure 4:
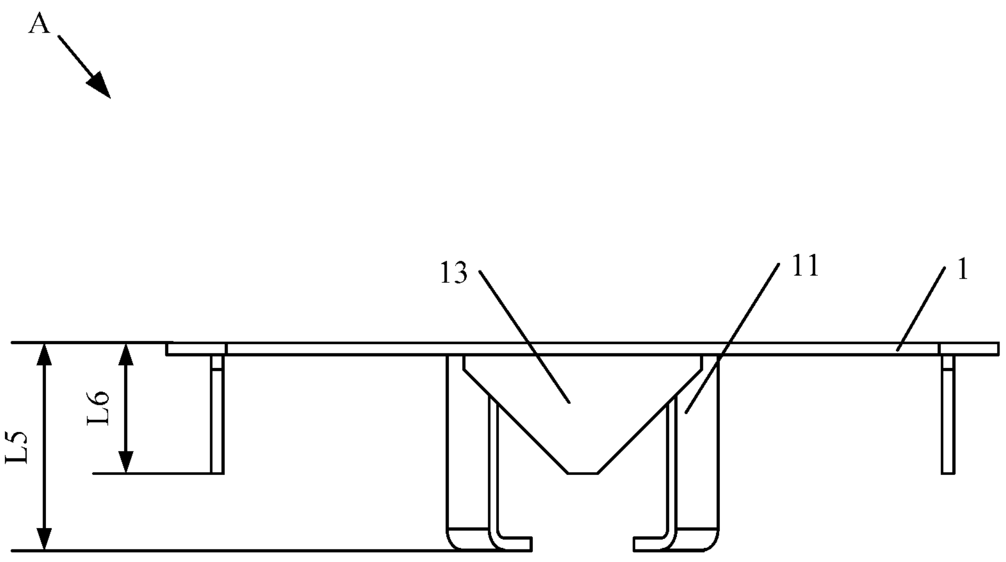
FIG. 4 is a schematic diagram of a front view size of an antenna vibrator provided by a first embodiment of the present application.

As shown in FIG. 4, the height L6 of the bending portion 13 is greater than or equal to 0.045 center frequency wavelengths and less than or equal to 0.085 center frequency wavelengths. It should be noted that the antenna has a certain operating frequency range, and in this range, the antenna has the minimum impedance and the highest efficiency. The middle optimum point of the operating frequency range is center operating frequency, and the center frequency wavelength refers to the wavelength of the center operating frequency. In an implementation, the height L6 of the bending portion 13 is set to be 0.065 center frequency wavelengths.

Figure 3:
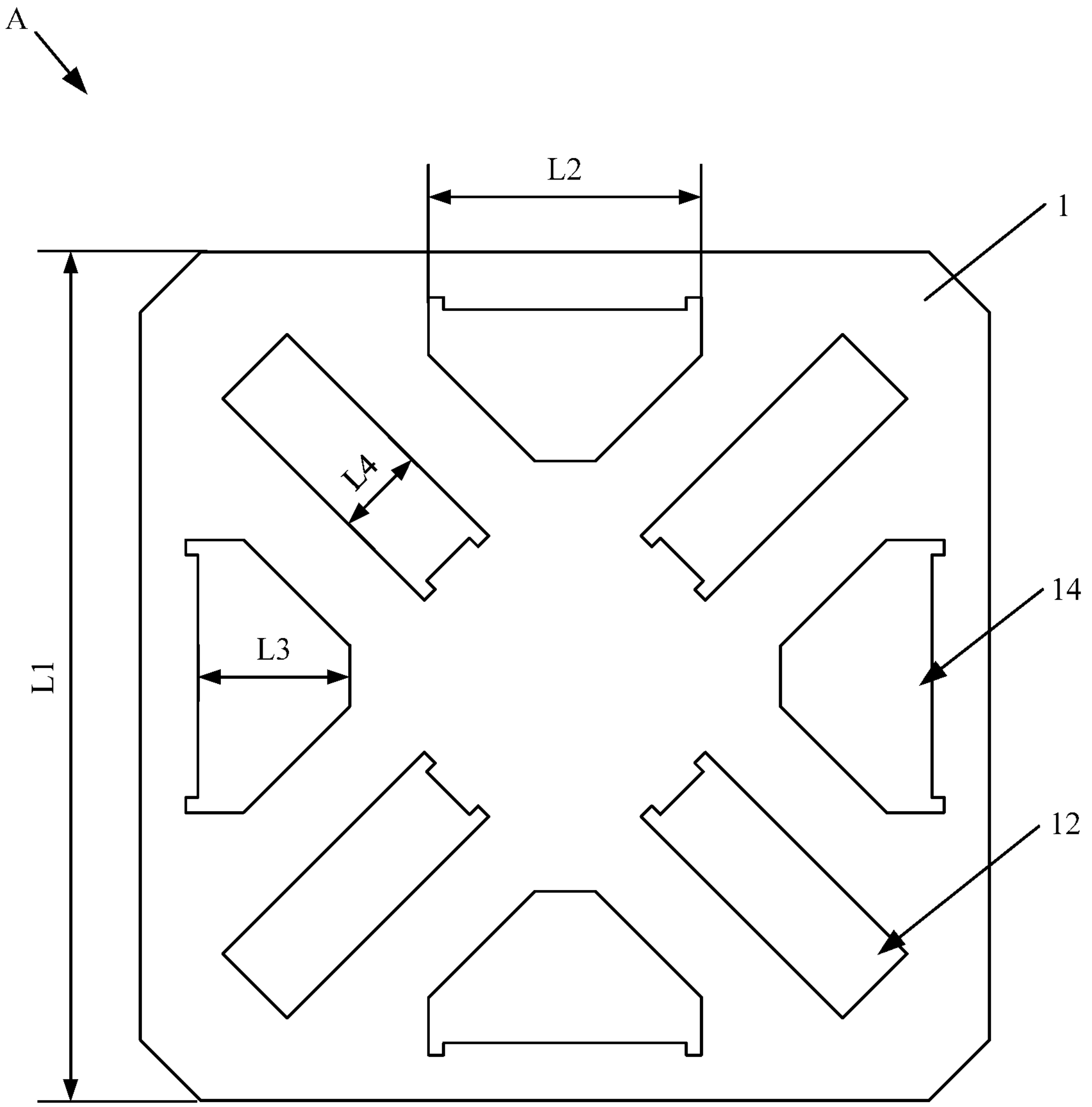
FIG. 3 is a schematic diagram of a top view size of an antenna vibrator provided by a first embodiment of the present application.

In this embodiment, the radiation board 1 is square. In other words, the antenna vibrator A is formed by stamping a square sheet metal part. Further, as shown in FIG. 3, a side length L1 of the radiation board 1 is greater than or equal to 0.32 center frequency wavelengths and less than or equal to 0.42 center frequency wavelengths. In an implementation, the side length L1 of the radiation board 1 is set to be 0.37 center frequency wavelengths, that is, the antenna vibrator A is formed by stamping a sheet metal with the side length L1 being 0.37 center frequency wavelengths, and the operating frequency relative bandwidth of the antenna vibrator A is 14.3%. Further, there are four the first hollowed-out holes 12, and they are all formed as a rectangular through hole. The four first hollowed-out holes 12 are uniformly distributed at a diagonal of the radiation board 1, and form a centrally symmetrical cross shape. Correspondingly, there are four second hollowed-out holes 14, which are uniformly distributed in a region between the diagonals of the radiation board 1. Similarly, there are four support portions 11 and four bending portions 13.

As an optional implementation, the radiation board 1 may also be set to be other shapes of uniform symmetry, such as regular polygon or circular shape, so as to ensure stability of an antenna phase center. In another aspect, the antenna vibrator A is formed by stamping a sheet thin sheet metal, that is, the radiation board 1 is a thin sheet metal, so that the design requirements of lightweight antenna are met.

As shown in FIGS. 1 to 3, in this embodiment, the second hollowed-out hole 14 is in an isosceles trapezoidal shape, upper line with a shorter length is close to the center of the radiation board 1, lower line with a longer length is close to the edge of the radiation board 1, and the upper line and the lower line are parallel to adjacent sides of the radiation board 1. In another aspect, two waists of the second hollowed-out hole 14 are respectively parallel to an adjacent diagonal, that is, the two waists are perpendicular to each other. Further, as shown in FIG. 3, lower line length L2 of the second hollowed-out hole 14 is greater than or equal to 0.07 center frequency wavelengths and less than or equal to 0.13 center frequency wavelengths, and the height L3 of the second hollowed-out hole 14 is greater than or equal to 0.05 center frequency wavelengths and less than or equal to 0.09 center frequency wavelengths. In an implementation, the lower line length L2 of the second hollowed-out hole 14 is 0.1 center frequency wavelengths, and the height L3 is 0.07 center frequency wavelengths. It may be easily understood that the second hollowed-out hole 14 may also be set to other shapes, and the shape of bending portion 13 corresponds to the second hollowed-out hole 14.

As shown in FIGS. 1 and 2, in this embodiment, the support portion 11 is bent downwards along the inner edge of the first hollowed-out hole 12. In other words, the support portion 11 is located on an inward side. In an implementation, a bending angle of the support portion 11 is 90°, that is, the support portion 11 is perpendicular to the radiation board 1. Thus, after the antenna vibrator A is connected to a feed member B through the support portion 11, the radiation board 1 is kept parallel to an antenna cover C, so that propagation effect of electromagnetic wave is ensured.

As shown in FIG. 2, in this embodiment, the lower end of the support portion 11 is bent inwards to form a connecting portion 111, and the antenna vibrator A is electrically connected to the feed member B through the connecting portion 111. In an implementation, a bending angle of the connecting portion 111 is 90°, that is, the connecting portion 111 is perpendicular to the support portion 11 and parallel to the radiation board 1. Thus, after the antenna vibrator A is electrically connected through the connecting portion 111, the radiation board 1 is kept parallel to an antenna cover C, so that propagation effect of electromagnetic wave is ensured.

It should be noted that there are four support portions 11, and the number of connecting portion 111 corresponds to four. Thus, the antenna vibrator A is connected to four feed points on the feed member B through four connecting portions 111, that is, a four-point feeding manner is used to ensure stability of an antenna phase center.

As shown in FIG. 4, in this embodiment, the height L5 of the support portion 11 is greater than or equal to 0.06 center frequency wavelengths and less than or equal to 0.12 center frequency wavelengths. In an implementation, the height L5 of the support portion 11 is 0.09 center frequency wavelengths.

As shown in FIGS. 1 to 3, in this embodiment, the first hollowed-out hole 12 is rectangular, and the width is parallel to adjacent sides of the radiation board 1. Further, as shown in FIG. 3, the width L4 of the first hollowed-out hole 12 is greater than or equal to 0.025 center frequency wavelengths and less than or equal to 0.045 center frequency wavelengths. In an implementation, the width L4 of the first hollowed-out hole 12 is 0.035 center frequency wavelengths. It may be easily understood that the first hollowed-out hole 12 may also be set to other shapes, and the shape of support portion 11 corresponds to the first hollowed-out hole 12.

In a first embodiment of the present application, an improved design of the radiation surface of an antenna vibrator A is implemented by providing a bending portion 13 on a radiation board 1 of the antenna vibrator A, thereby achieving the optimization of the isolation of the antenna vibrator A and the cross polarization ratio of the antenna vibrator A after being arrayed, so that the cross polarization ratio of the array meets a conventional index without adding a boundary condition.

Figure 5:
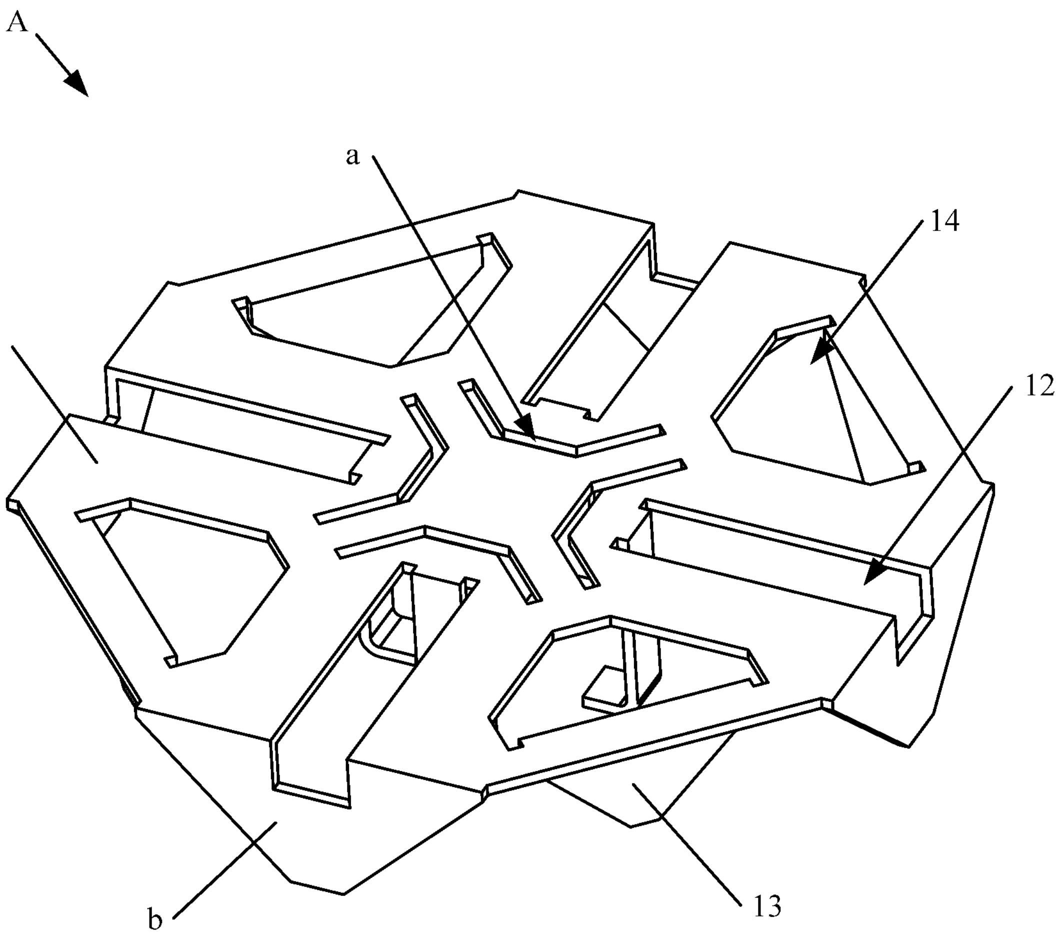
FIG. 5 is a schematic structural diagram of an antenna vibrator provided by a second embodiment of the present application.
Figure 6:
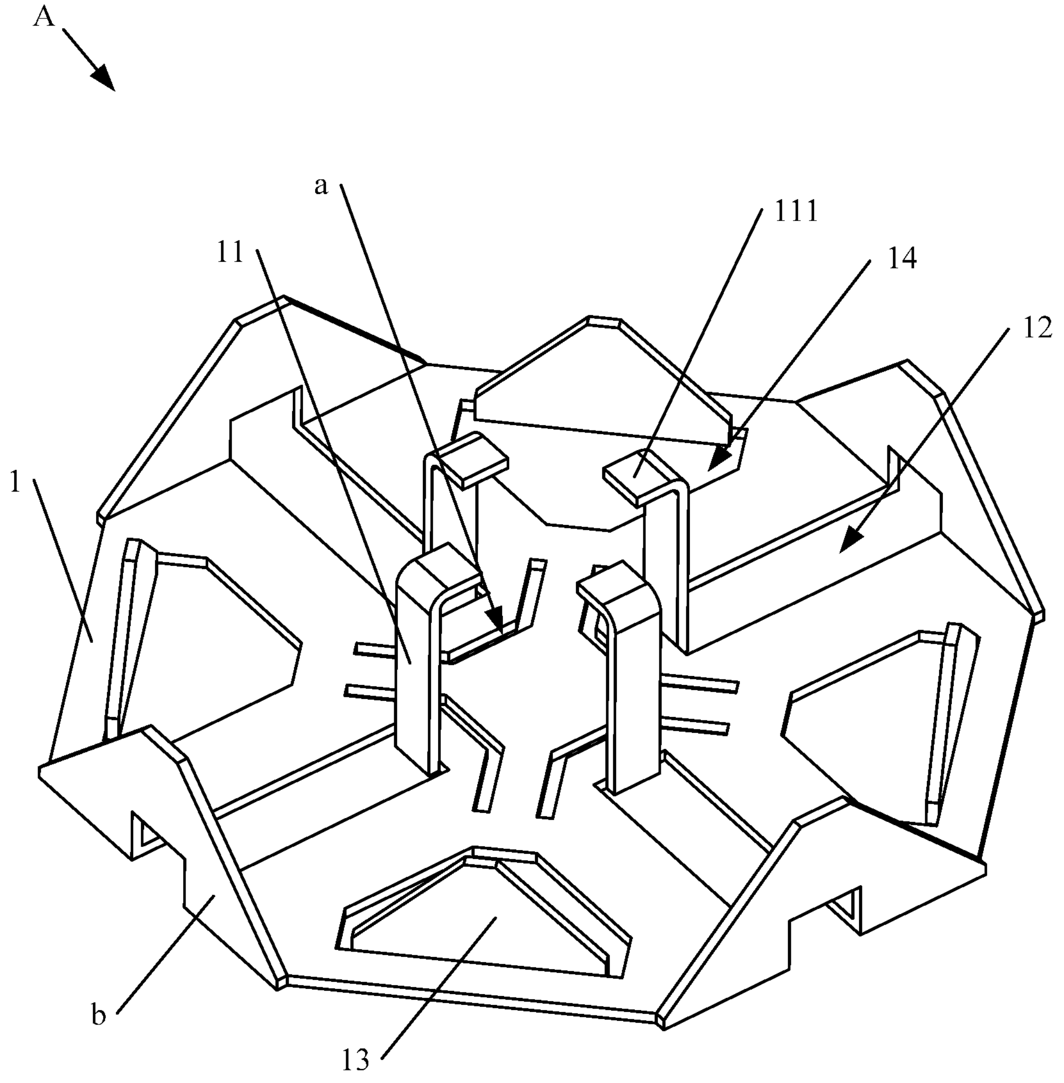
FIG. 6 is a schematic structural diagram of another view of an antenna vibrator provided by a second embodiment of the present application.

As shown in FIGS. 5 and 6, the second embodiment of the present application further provides an antenna vibrator A. Part of structure of the antenna vibrator A is described as above, and details are not described herein again. It should be noted that the antenna vibrator A further includes a plurality of slits a and/or a plurality of bending angle portions b, that is, the antenna vibrator A may include both the bending portion 13 and the slit a, may include both the bending portion 13 and the bending angle portion b, and may include the bending portion 13, the slit a, and the bending angle portion b simultaneously. Thus, the isolation of the antenna vibrator A and the cross polarization ratio of the array may be further optimized by providing the slit a and/or the bending angle portion b on the basis of the bending portion 13.

Specifically, in an implementation, the antenna vibrator A includes both the bending portion 13 and the slit a, where the slit a is located in the central region of the radiation board 1, that is, in inner region of the plurality of first hollowed-out holes 12, and the number and distribution of the slits a are matched with the first hollowed-out holes 12. More specifically, corresponding to the four rectangular first hollowed-out holes 12, the four slits a respectively include a main part parallel to the width of the adjacent first hollowed-out hole 12 and two symmetric extension parts inclined outwards from both ends of the main part. It should be noted that an angle between the main part and the extension part of the slit a is 135°. In another aspect, the width of the slit a may be set as required, and the length of the slit a is greater than or equal to 0.05 center frequency wavelengths and less than or equal to 0.25 center frequency wavelengths. The length of the main part of the slit a is greater than or equal to 0.04 center frequency wavelengths and less than or equal to 0.06 center frequency wavelengths. Thus, the antenna vibrator A is additionally provided with the slit a, so that the isolation of the antenna vibrator A and the cross polarization ratio of the array are further optimized.

In another implementation, the antenna vibrator A includes both the bending portion 13 and the bending angle portion b. It should be noted that, the antenna vibrator A is formed by stamping a square sheet metal part, and the bending angle portion b is formed by stamping four corners of the square. Further, bending direction and bending angle of the bending angle portion b are the same as those of the bending portion 13. In another aspect, the diagonal of the radiation board 1 is perpendicular to the plane of the corresponding bending angle portion b. In this embodiment, the height of the bending angle portion b is greater than or equal to 0.045 center frequency wavelengths and less than or equal to 0.105 center frequency wavelengths. Thus, the antenna vibrator A is additionally provided with the bending angle portion b, so that the isolation of the antenna vibrator A and the cross polarization ratio of the array are further optimized.

In another implementation, the antenna vibrator A includes a bending portion 13, a slit a, and a bending angle portion b simultaneously, where structure features of the slit a and the bending angle portion b are as described above, and details are not described herein again. It may be easily understood that the antenna vibrator A is additionally provided with the slit a and the bending angle portion b, so that the isolation of the antenna vibrator A and the cross polarization ratio of the array are further optimized.

In a second embodiment of the present application, an improved design of the radiation surface of an antenna vibrator A is implemented by additionally providing a slit a and/or a bending angle portion b on the basis of an existing bending portion 13, thereby further optimizing isolation of the antenna vibrator A and the cross polarization ratio of the antenna vibrator A after being arrayed, so that the cross polarization ratio of the array meets a conventional index without adding a boundary condition.

Figure 7:
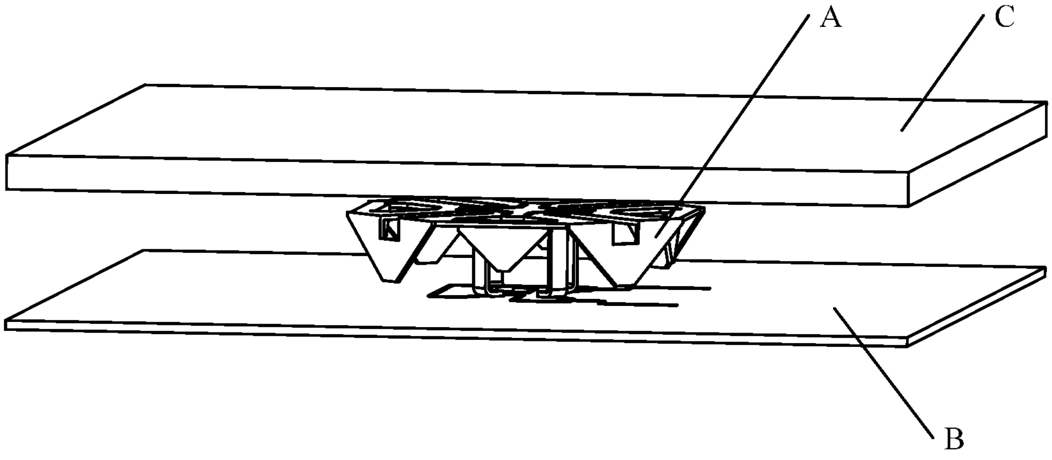
FIG. 7 is a schematic structural diagram of an antenna provided by a third embodiment of the present application.
Figure 8:
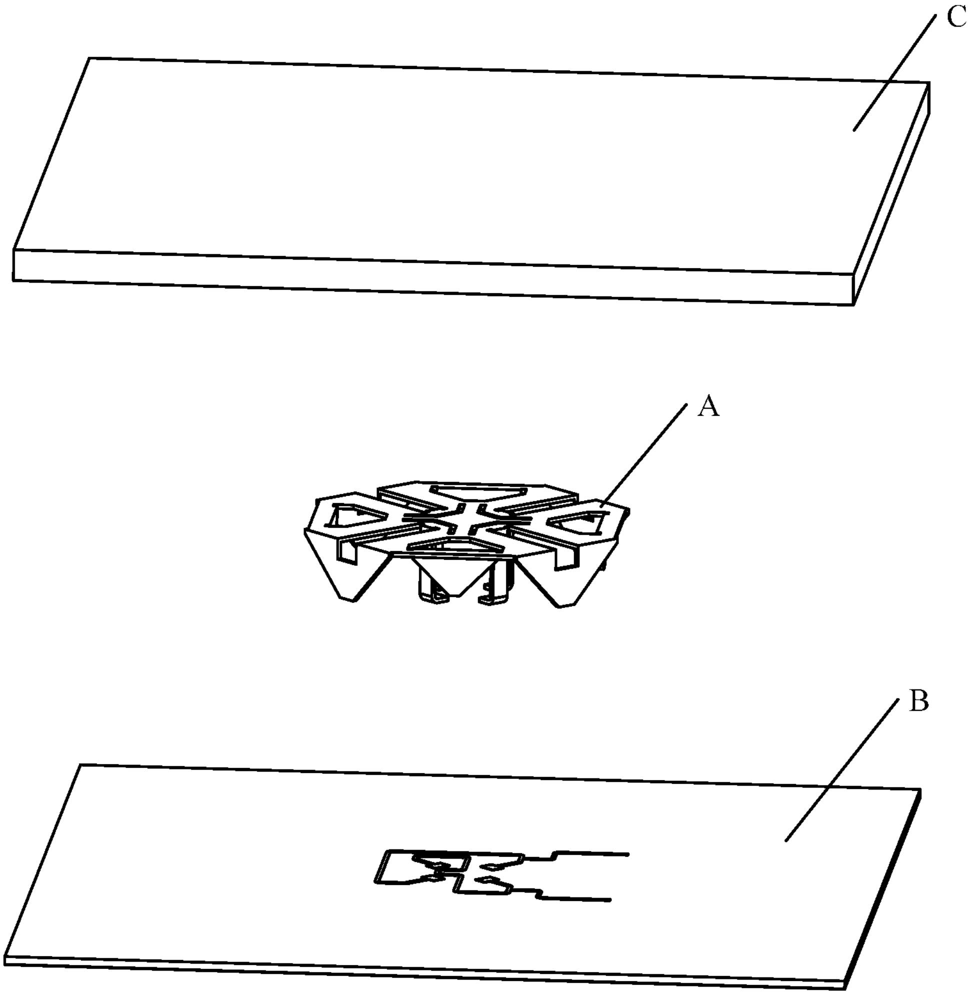
FIG. 8 is an explosion schematic diagram of an antenna provided by a third embodiment of the present application.

As shown in FIGS. 7 and 8, a third embodiment of the present application provides an antenna, including an antenna vibrator A, a feed member B, an antenna cover C, and a reflection board. A structure of the antenna vibrator A is described as above, and details are not described herein again. The antenna vibrator A is electrically connected to the feed member B through the connecting portion 111 on the support portion 11, and the antenna cover C covers the antenna vibrator A.

Specifically, the feed member B includes a circuit board, and one side of the circuit board facing the antenna vibrator A is provided with a feed circuit. A connecting portion of the antenna vibrator A is connected to a feed point of the feed circuit by means of fully automatic reflow soldering (surface-mount soldering) or other manners, so that assembly manpower and assembly time may be saved. The antenna cover C is made of materials such as polyvinyl chloride or fiber glass-reinforced plastics, so as to play a role of packaging protection.

In a third embodiment of the present application, an improved design of the radiation surface of an antenna vibrator A is implemented by providing the bending portion 13 on the antenna vibrator A, or additionally providing a slit a and/or the bending angle portion b on the basis of an existing bending portion 13, thereby achieving the optimization of the isolation of the antenna vibrator A and the cross polarization ratio of the antenna vibrator A after being arrayed, so that the cross polarization ratio of the array meets a conventional index without adding a boundary condition.

The embodiments of the present application provide an antenna vibrator and an antenna, and the antenna vibrator includes a radiation board. A partial region of the radiation board is bent downwards to form a plurality of support portions and a plurality of corresponding first hollowed-out holes, and a region between two adjacent first hollowed-out holes is bent downwards to form a plurality of bending portions and a plurality of corresponding second hollowed-out holes. The support portion serves to support and connect. At the same time, by forming the bending portion and the second hollowed-out hole on the radiation board, the isolation of the vibrator is optimized, and the cross polarization ratio after the vibrator being arrayed may meet conventional index without adding a boundary condition.

The above description is only the preferred embodiment of the present disclosure and is not intended to limit the present disclosure, and various modifications and changes may be made in the present disclosure for those skilled in the art. Any modification, equivalent replacement, or improvement made within the spirit and principle of the present disclosure should be inclusive in the protection scope of the present disclosure.

We claim:

1. An antenna vibrator, wherein the antenna vibrator (A) comprises:

a radiation board (1), wherein a partial region of the radiation board (1) is bent downwards to form a plurality of support portions (11) and a plurality of first hollowed-out holes (12), and a region of the radiation board (1) between the two adjacent first hollowed-out holes (12) is bent downwards to form a plurality of bending portions (13) and a plurality of second hollowed-out holes (14), the support portions are connected to a feed member (B).

2. The antenna vibrator according to claim 1, wherein each bending portion (13) is bent downwards along an outer edge of a second hollowed-out hole (14).

3. The antenna vibrator according to claim 1, wherein the height of the bending portion (13) is greater than or equal to 0.045 center frequency wavelengths and less than or equal to 0.085 center frequency wavelengths.

4. The antenna vibrator according to claim 1, wherein the radiation board (1) is square, and a side length of the radiation board (1) is greater than or equal to 0.32 center frequency wavelengths and less than or equal to 0.42 center frequency wavelengths; and the four first hollowed-out holes (12) are uniformly distributed at a diagonal of the radiation board (1).

5. The antenna vibrator according to claim 4, wherein the second hollowed-out hole (14) is in an isosceles trapezoidal shape, lower line length of the second hollowed-out hole (14) is greater than or equal to 0.07 center frequency wavelengths and less than or equal to 0.13 center frequency wavelengths, and the height of the second hollowed-out hole (14) is greater than or equal to 0.05 center frequency wavelengths and less than or equal to 0.09 center frequency wavelengths.

6. The antenna vibrator according to claim 1, wherein each support portion (11) is bent downwards along an inner edge of a first hollowed-out hole (12).

7. The antenna vibrator according to claim 1, wherein a lower end of the support portion (11) is bent to form a connecting portion (111).

8. The antenna vibrator according to claim 1, wherein the height of the support portion (11) is greater than or equal to 0.06 center frequency wavelengths and less than or equal to 0.12 center frequency wavelengths.

9. The antenna vibrator according to claim 1, wherein the first hollowed-out hole (12) is rectangular, and the width of the first hollowed-out hole (12) is greater than or equal to 0.025 center frequency wavelengths and less than or equal to 0.045 center frequency wavelengths.

10. An antenna, comprising:

a feed member (B);

the antenna vibrator (A) according to claim 1, wherein the antenna vibrator (A) is electrically connected to the feed member (B) through the support portion (11); and an antenna cover (C) covering the antenna vibrator (A).

11. The antenna vibrator according to claim 10, wherein each bending portion (13) is bent downwards along an outer edge of a second hollowed-out hole (14).

12. The antenna vibrator according to claim 10, wherein the height of the bending portion (13) is greater than or equal to 0.045 center frequency wavelengths and less than or equal to 0.085 center frequency wavelengths.

13. The antenna vibrator according to claim 10, wherein the radiation board (1) is square, and a side length of the radiation board (1) is greater than or equal to 0.32 center frequency wavelengths and less than or equal to 0.42 center frequency wavelengths; and the four first hollowed-out holes (12) are uniformly distributed at a diagonal of the radiation board (1).

14. The antenna vibrator according to claim 13, wherein the second hollowed-out hole (14) is in an isosceles trapezoidal shape, lower line length of the second hollowed-out hole (14) is greater than or equal to 0.07 center frequency wavelengths and less than or equal to 0.13 center frequency wavelengths, and the height of the second hollowed-out hole (14) is greater than or equal to 0.05 center frequency wavelengths and less than or equal to 0.09 center frequency wavelengths.

15. The antenna vibrator according to claim 10, wherein each support portion (11) is bent downwards along an inner edge of a first hollowed-out hole (12).

16. The antenna vibrator according to claim 10, wherein a lower end of the support portion (11) is bent to form a connecting portion (111).

17. The antenna vibrator according to claim 10, wherein the height of the support portion (11) is greater than or equal to 0.06 center frequency wavelengths and less than or equal to 0.12 center frequency wavelengths.

18. The antenna vibrator according to claim 10, wherein the first hollowed-out hole (12) is rectangular, and the width of the first hollowed-out hole (12) is greater than or equal to 0.025 center frequency wavelengths and less than or equal to 0.045 center frequency wavelengths.

* * * * *